United States Patent
Bacardit (10) Patent No.: US 6,553,888 B2
(45) Date of Patent: Apr. 29, 2003

(54) SERVOMOTOR FOR AN EMERGENCY BRAKING

(75) Inventor: Juan Simon Bacardit, Calle Mallorca (ES)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 09/857,341

(22) PCT Filed: Apr. 19, 2001

(86) PCT No.: PCT/FR01/01202
§ 371 (c)(1),
(2), (4) Date: Jun. 4, 2001

(65) Prior Publication Data
US 2002/0105223 A1 Aug. 8, 2002

(30) Foreign Application Priority Data
Apr. 21, 2000 (WO) ................................ PCT/FR00/05669

(51) Int. Cl.[7] .................................................. F15B 9/10
(52) U.S. Cl. ..................................... 91/369.3; 91/376 R
(58) Field of Search ........................... 91/369.3, 376 R; 60/554

(56) References Cited

U.S. PATENT DOCUMENTS 6,082,241 A * 7/2000 Kobayashi et al. ........ 91/376 R

* cited by examiner

Primary Examiner—Edward K. Look
Assistant Examiner—Michael Leslie
(74) Attorney, Agent, or Firm—Leo H McCormick, Jr.; Warren Comstock (57) ABSTRACT

A pneumatic servomotor for providing an assisted braking of a motor vehicle. The servomotor includes a plunger arrangement with a unidirectional clutch device (56). The clutch device (56) has a coaxial sleeve (58) that slides on a plunger (46) and a substantially ring-shaped key (60) with a given clearance around the sleeve (58). The key (60) is driven by a moving piston (22) in response to a predetermined rate of speed being applied to a control rod (38) by an input force. The predetermined rate of speed causes the key (60) to rock and lock the sleeve (58) with respect to the piston (22) independently of the control rod (38). The unidirectional clutch device (56) comprises at least one locking transverse face (76) for engagement with the sleeve (58). The face (76) is axially directed rearwards from a front end of the sleeve (58) to form a stop for a peg (78) located on the key (60) that extends radially towards the sleeve (58) for axial indexing an end locking position for the sleeve (58).

9 Claims, 7 Drawing Sheets

SERVOMOTOR FOR AN EMERGENCY BRAKING

This invention relates to a pneumatic servomotor used for assisting in the braking of a motor vehicle.

BACKGROUND OF THE INVENTION

More particularly, the present invention relates to a pneumatic servomotor for an assisted braking of a motor vehicle, of the type comprising a rigid casing, in which a transverse partition wall is movable, thus defining in an airtight manner a front chamber under a first engine negative pressure, and a rear chamber under a second pressure, varying between the engine negative pressure and the atmospheric pressure; of the type including a moving piston, integral with the moving partition wall and travelling with the latter, and a control rod, moving inside the piston, in a selective manner as a function of an axial input force, exerted in the forward direction against a return force applied to the rod by a return spring; of the type according to which the control rod is biased towards either an intermediate actuation position or an end actuation position, resulting from the applying of the input force at a determined high speed; of the type comprising a plunger, arranged at the front part of the control rod inside the piston, and a three-way valve, including at least an annular seat borne by a rear section of the plunger, and capable of varying the second pressure, prevailing within the rear chamber, particularly by connecting the front chamber with the rear chamber when the control rod is in the rest position, or by gradually connecting the rear chamber with the atmospheric pressure when the control rod is actuated; of the type in which, in the end actuation position of the control rod, a finger, which is slidingly fitted on the front end of the plunger, is biased by the plunger into contact with a reaction disk, integral with the moving piston, so as to transmit the reaction force of the moving piston to the plunger and to the control rod; and of the type comprising a unidirectional clutch device, which includes a coaxial sleeve, sliding on the plunger, and a substantially ring-shaped key, arranged with a given clearance around the sleeve and capable of being driven by the moving piston, when the input force is applied at the determined speed, so as to rotate on a generally transverse axis in order to cooperate with the periphery of the sleeve and lock it in an end front axial position, in which a front end annular bearing surface of the sleeve locks the finger, independently of the plunger and of the control rod.

In a well-known manner, such a design is most suitable as regards safety, in the case of an emergency braking situation.

As a matter of fact, a conventional servomotor comprises neither a finger nor a unidirectional clutch device for the finger. Thus the finger is likely to bias directly the reaction disk, integral with the rear face of the moving piston.

In a full-braking situation, in which case a maximum braking force is applied on the control rod, the actuation of the control rod causes the finger-forming plunger to be actuated, which fact results in the maximum opening of the three-way valve and, therefore, the rear chamber is subjected to the atmospheric pressure. Thus, the moving partition wall travels forward and the end of the plunger contacts the reaction disk, integral with the rear face of the moving piston.

Therefore, the force, which is applied onto the moving piston when the control rod reaches the end of its stroke, results from the assisting force, arising from the pressure difference between each side of the moving partition wall, and from the force exerted by the finger-forming plunger onto said moving piston. Besides, the driver feels the braking reaction force, which is transmitted from the moving piston to the plunger, through the reaction disk.

As a matter of fact, it has been established that quite a number of drivers, when confronted with an emergency braking situation, underestimated the risks actually incurred and, after having jammed the brakes on, would somewhat release the braking force at the very time when a considerable force should have been maintained in order to avoid an accident.

In the case of a full-braking situation, accompanied by the swift travel of the control rod, the plunger may touch the reaction disk and therefore give the driver the feeling of a maximum braking action even before the pressure difference between the front and rear chambers actually reaches its maximum value, which may lead the driver to release the braking force even though it should be maintained so as to profit by the maximum braking force.

A servomotor, like that of the above-described type, makes it possible to eliminate such a disadvantage, in that the plunger is locked into contact with the reaction disk, by means of the sleeve, which results in a maximum force being maintained on the rear face of the moving piston, even though the driver may have released the braking force in part.

Yet, the servomotor of the previously described type has She disadvantage of fixing the sleeve in an axial position but in a rather inaccurate manner.

As a matter of fact, when the key locks the sleeve simply by wedging, that is through a very small contact area, not to say an almost pinpoint one, between an edge of a circular opening made in the key and the periphery of the sleeve, the sleeve is likely to slip when the key comes into contact with it.

In order to cope with said difficulty, the present invention provides reliable sleeve-securing means.

SUMMARY OF THE INVENTION

Therefore, it is the object of the present invention to provide a servomotor of the above described type, characterised in that the unidirectional clutch device comprises at least one locking transverse face for the sleeve, said face being axially directed rearwards so as to form a stop for a peg, provided on the key and extending radially towards the sleeve, for an axial indexing of the end locking position of the sleeve.

According to other features of this invention:

the sleeve has a cylindrical periphery, with a substantially constant diameter and it comprises a radial groove, a shoulder-forming front transverse face of which constitutes the locking transverse face;

the groove exhibits a substantially truncated-cone-shaped profile, rearwardly of the shoulder-forming front transverse face;

the peg has the shape of a concave truncated-cone-shaped angular sector, which is complementary to the truncated-cone-shaped profile of the groove in the sleeve;

the key has, in an axial sectional view, the shape of a tee, the vertical branch of which is substantially radially directed and traversed by the sleeve, whereas its horizontal branch, which is substantially axially directed, is received, without any axial clearance, between two opposite walls of a cavity traversing the piston, perpendicularly to its axis, so as to allow but a rocking motion of the key inside the cavity;

the front horizontal half-branch of the tee key has a face which radially faces the sleeve and from which the peg protrudes;

the front end of the front half-branch of the tee key is shaped into a convex arc of a cylinder in the direction of an axis, orthogonal to the piston axis, so as to bear against a front transverse wall of the cavity;

the rear end of the rear half-branch of the tee key is shaped into a convex arc of a cylinder in the direction of an axis, orthogonal to the piston axis, so as to cooperate with a rear transverse wall of the cavity;

the tee key is resiliently biased against the transverse wall of the cavity by a compression spring, arranged between the front transverse wall of the cavity and a centering spigot, provided on the tee key and protruding from a part of the vertical branch of the tee, radially on the opposite side relatively to the peg.

Other features and advantages of the present invention will be apparent from the following detailed description, by way of example and by no means as a limitation, when taken in conjunction with the accompanying drawings; in which:

DETAILED DESCRIPTION OF THE INVENTION

In the following description, the same reference numerals will designate the same elements, or elements having similar functions.

As a rule, the terms "front", "rear", "upper" and "lower" refer respectively to elements or positions facing leftward, rightward, upward or downward in FIGS. 1 through 4.

Figure 3:
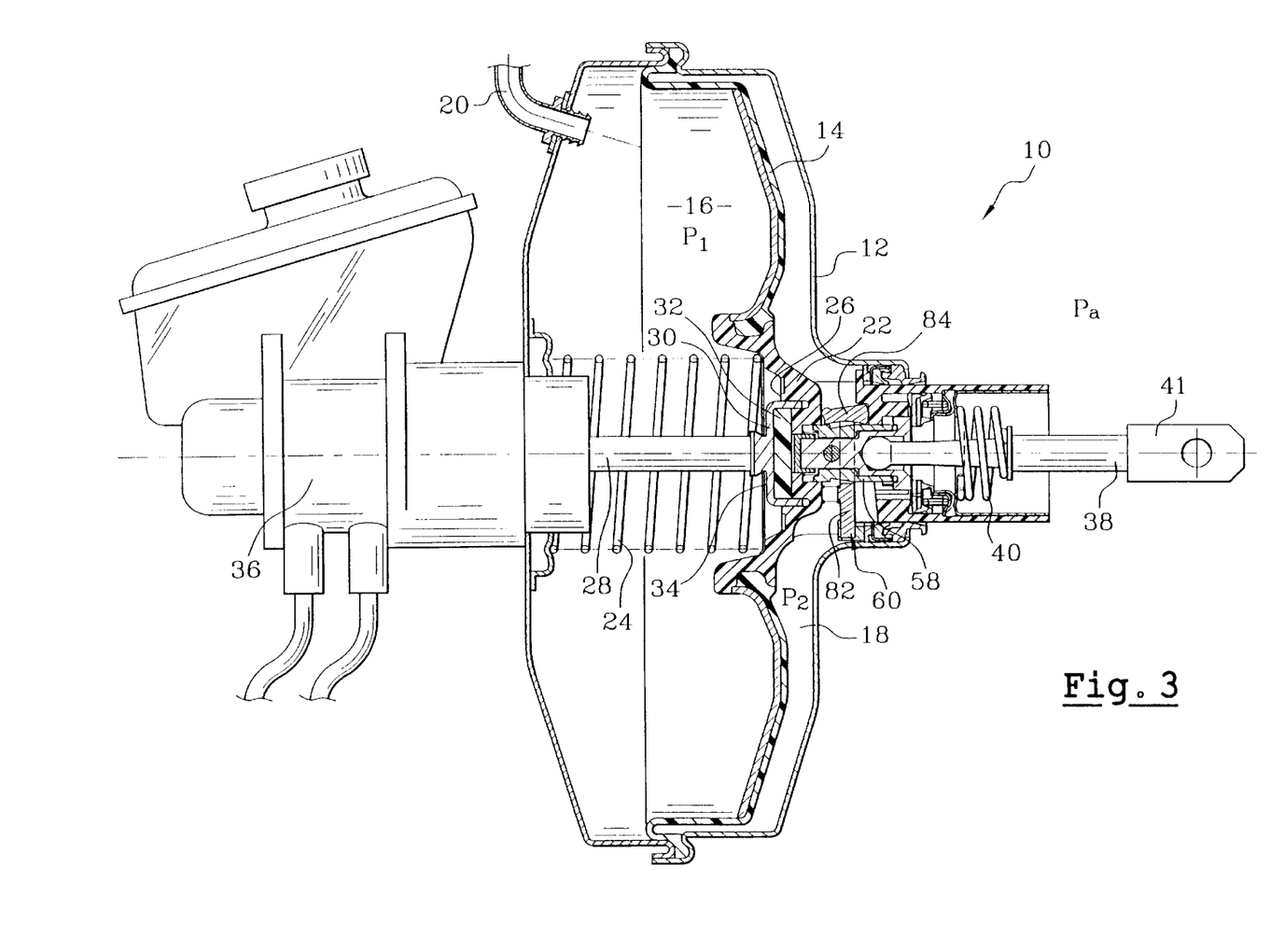
FIG. 3 is an axial sectional view, showing a pneumatic servomotor for an assisted braking according to the present invention.

FIG. 3 illustrates a pneumatic servomotor 10 for an assisted braking of a motor vehicle.

In a well-known manner, the pneumatic servomotor 10 comprises a rigid casing 12, in which a transverse partition wall 14 is movably mounted, so as to define therein, in an airtight manner, a front chamber 16 under a first pressure "$P_1$", the value of which is equal to the negative pressure value of the vehicle engine, and a rear chamber 18 under a second pressure "$P_2$". Said second pressure "$P_2$" may vary between the engine negative pressure value "$P_1$" and the atmospheric pressure "$P_a$", as will be further explained hereunder.

The front chamber 16 is supplied with the pressure "$P_1$" through a negative-pressure pipe 20, connected to a vacuum source of the vehicle, for instance a negative pressure prevailing in an inlet manifold (not shown) of a vehicle engine.

The pneumatic servomotor 10 comprises a moving piston 22, integral with the moving partition wall 14. Inside the casing 12, the moving partition wall 14 is resiliently returned by a return spring 24, which rests on the casing 12 and on a front face 26 of the moving piston 22. The front face 26 of the moving piston 22 carries a reaction cup 30, in which a reaction disk 32, made of an elastomeric material, is accommodated in a manner to be described below. The front face 34 of the reaction cup 30 is integral with an actuating rod 28, which therefore travels with the moving piston 22, for the actuation of a hydraulic-brake master cylinder 36 of the vehicle.

A control rod 38, e.g. connected to the brake pedal of the vehicle through a coupling sleeve 41, arranged at its free rear end, may selectively travel within the moving piston 22, as a function of an input axial force, applied to the control rod 38 in the forward direction. The actuation force is exerted against a return force, applied to the rod 38 by a return spring 40, arranged between the moving piston 22 and the control rod 38.

Figure 1:
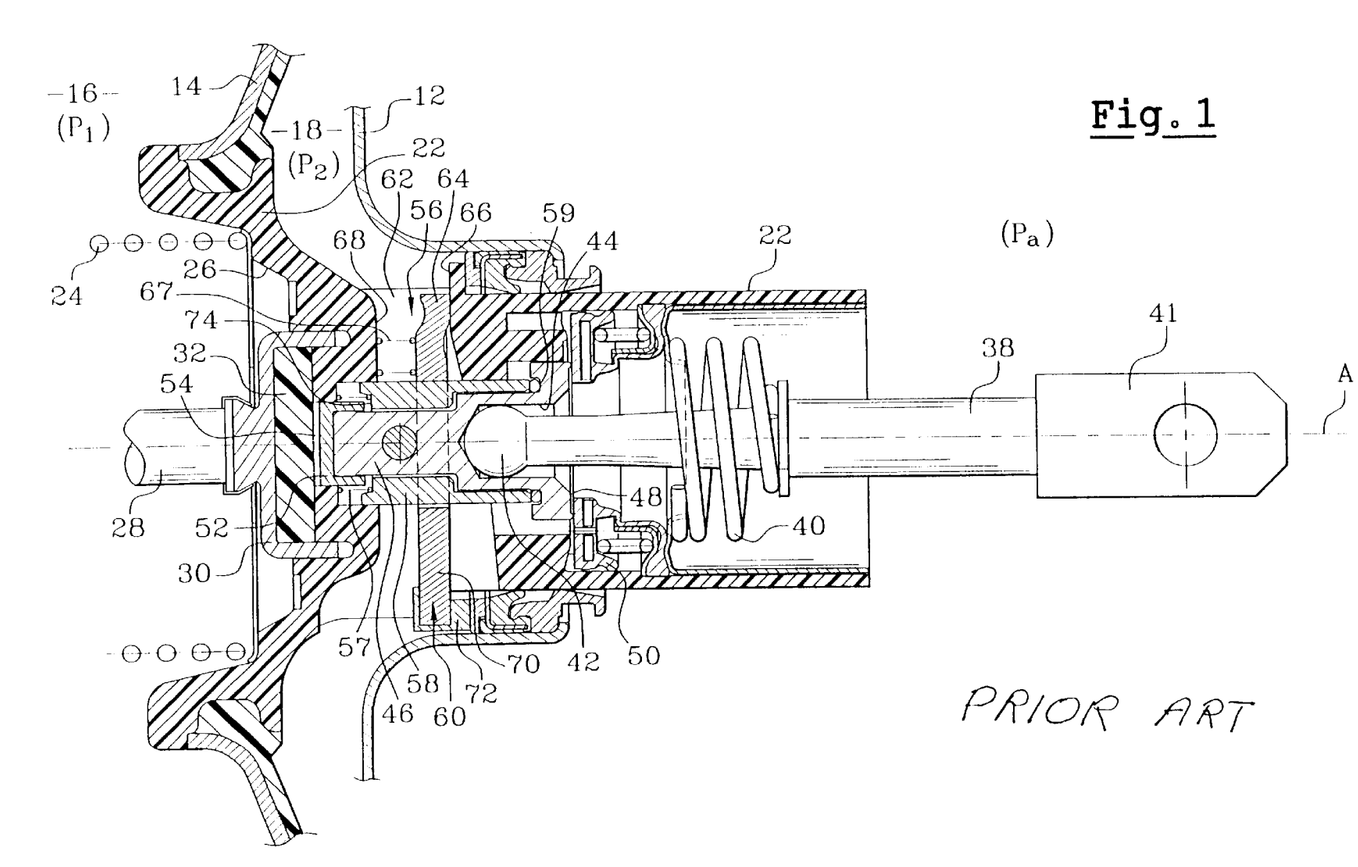
FIG. 1 is a detail axial sectional view, showing a pneumatic servomotor for an assisted braking according to the prior art.

FIG. 1 shows more specifically that the front end of the control rod 38 is shaped into a toggle 42, received in a housing 44 having a complementary shape and provided in a substantially cylindrical plunger 46, which is slidably mounted in the moving piston 22.

A rear annular seat 48 of the plunger 46 belongs to a three-way valve 50, capable of varying the second pressure "$P_2$", prevailing in the rear chamber 18, more particularly by connecting the front chamber 16 with the rear chamber 18 when the control rod 38 is in the rest position, or by gradually subjecting the rear chamber 18 to the atmospheric pressure "$P_a$" when the control rod 38 is actuated.

Since the mode of operation of the three-way valve 50 is known from the state of the art, it will not be further described herein.

In a well-known manner, a finger 52 is slidably fitted both on the front end of the plunger 46, in the opposite direction to the housing 44, and inside a bore 54 provided in the moving piston 22 and opening facing the reaction cup 30. Therefore, the finger 52 is capable of being biased by the plunger 46 so as to bias, in turn, the reaction disk 32 and compress it, and thus the reaction force of the moving piston 22 is transferred onto the plunger 46 and, in consequence, onto the control rod 38, in an end-of-stroke actuating position of the control rod 38.

Figure 2:
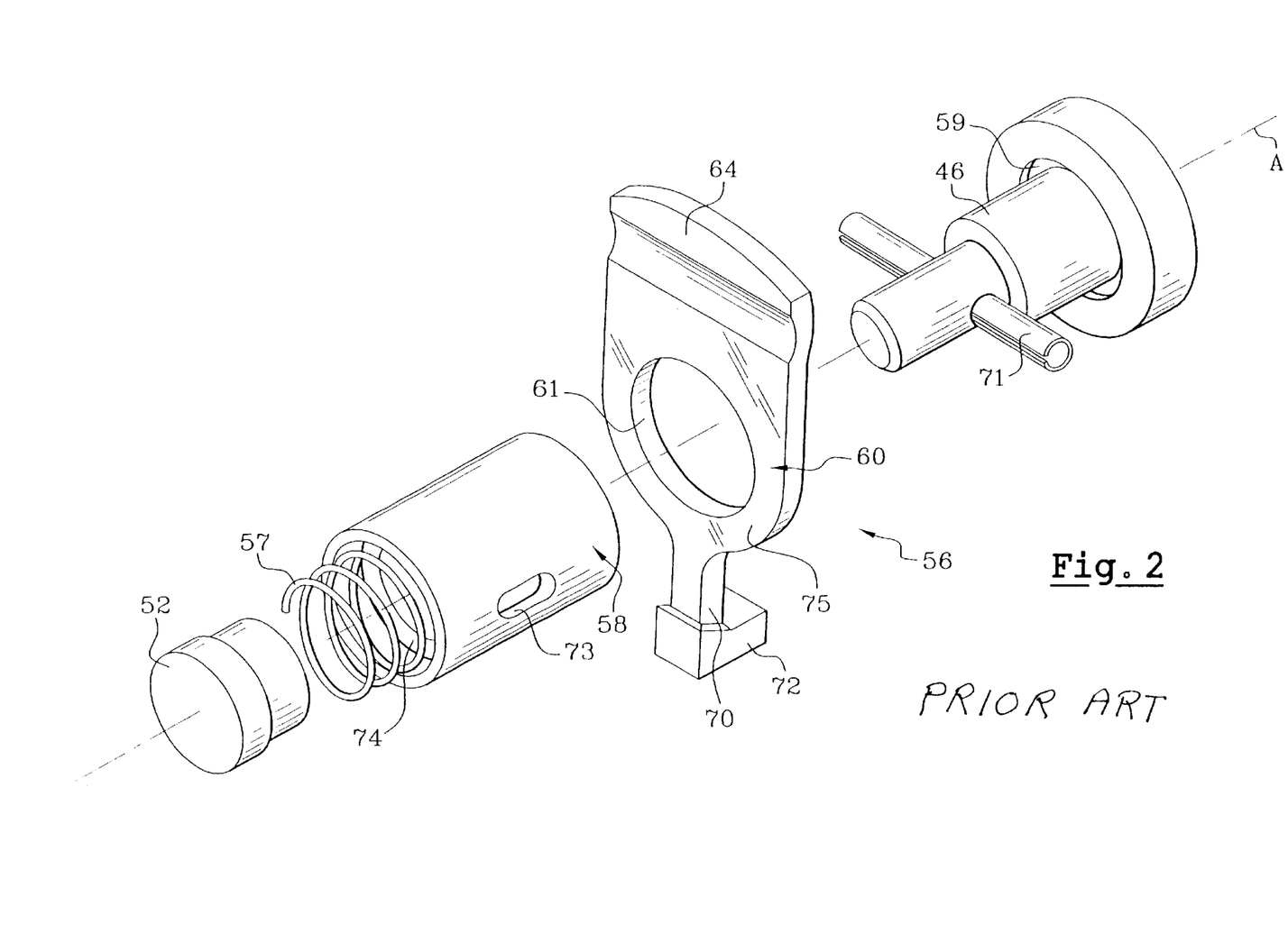
FIG. 2 is a detail three-quarter front perspective exploded view of the finger, the sleeve, the key and the plunger of the servomotor shown in FIG. 1.

As is well known too, and as shown in FIGS. 1 and 2, the servomotor 10 includes a unidirectional clutch device 56, comprising, on the one hand, a coaxial sleeve 58 sliding on the plunger 46 and resiliently returned through a spring 57, which is arranged between the piston 22 and the sleeve 58, into contact with a shoulder-forming face 59 of the plunger 46, and comprising, on the other hand, a substantially ring-shaped key 60, fitted around the sleeve 58 with a radial clearance. More particularly, when the servomotor 10 is in the assembled state, the sleeve 58 passes through a circular opening 61, made in the key 60.

The key 60 is received within a cavity 62, traversing the piston 22 perpendicularly to its axis A. An upper part 64 of the key 60 is resiliently biased into abutment against a rear wall 66 of the cavity 62, by means of a return spring 67 arranged between a front wall 68 of the cavity 62 and the upper part 64 of the key 60.

In the rest position, a lower part 70 of the key 60 bears on a support 72 provided on the casing 12 of the servomotor 10. A transverse pin 71, extending through an opening 73 cut in the sleeve 58 and the plunger 46, bears, in the rest position of the control rod 38, on a front face 75 of the key 60 so as to define the rest position of the plunger 46.

In that way, when an input force is applied in the forward direction, in accordance with a full stroke of the control rod 38, especially at a determined speed of the latter, the upper part 64 of the key 60 is driven by the piston 22, whereas its lower part 70 separates from the support 72. It results in that the key 60 rocks about a generally transverse axis anticlockwise so as to cooperate with the periphery of the sleeve 58.

As long as such travel of the control rod 38 is continuing and as long as the latter drives the sleeve 58, through the shoulder-forming face 59, the force, exerted on the control rod 38, is enough to prevent the complete locking of the sleeve 58, since such force is higher than that applied by the spring 67 onto the key 60.

On the other hand, if the driver releases the force exerted on the control rod 38 too soon, the sleeve 58 is locked by the key 60 in an end front axial position, in which an annular bearing surface 74 at the front end of the sleeve locks the finger 52, independently of the plunger and the control rod, which means that a maximum braking force is maintained as long as the return of the control rod 38 does not cause the three-way valve 50 to reopen and, consequently, the piston 22 to move backwards in the return direction.

However, in such design, the key 60 has the disadvantage of being unable to lock the sleeve 58 in an accurate axial position.

As a matter of fact, the wedging of the sleeve 58 by the key 60 results from an almost pinpoint contact of an edge of the opening 61 of the key 60 with the periphery of the sleeve 58.

On the one hand, said contact happens dependently on how the key 60 rocks on the periphery of the sleeve 58. Since such a rocking motion of the key 60 is brought about by the piston 22 driving it, the travel speed of the piston 22 is determinant, owing to the inertia of the elements involved, as regards the location of the contact point between the key 60 and the periphery of the sleeve 58, such position being likely to vary by a few tenths of a millimeter.

On the other hand, since such contact is an almost pinpoint one, i.e. it has a very small surface area, on the release of the biasing force exerted by the control rod 38, the sleeve is likely to slip off in part under the edge of the opening 61 in the key 60, under the influence of various reasons, such as vibrations or a series of alternate forces exerted by the driver on the control rod 38.

In order to cope with said difficulty, the invention provides a servomotor of the above-described type, which ensures an accurate positioning of the key 60 along the periphery of the sleeve 58.

Figure 4:
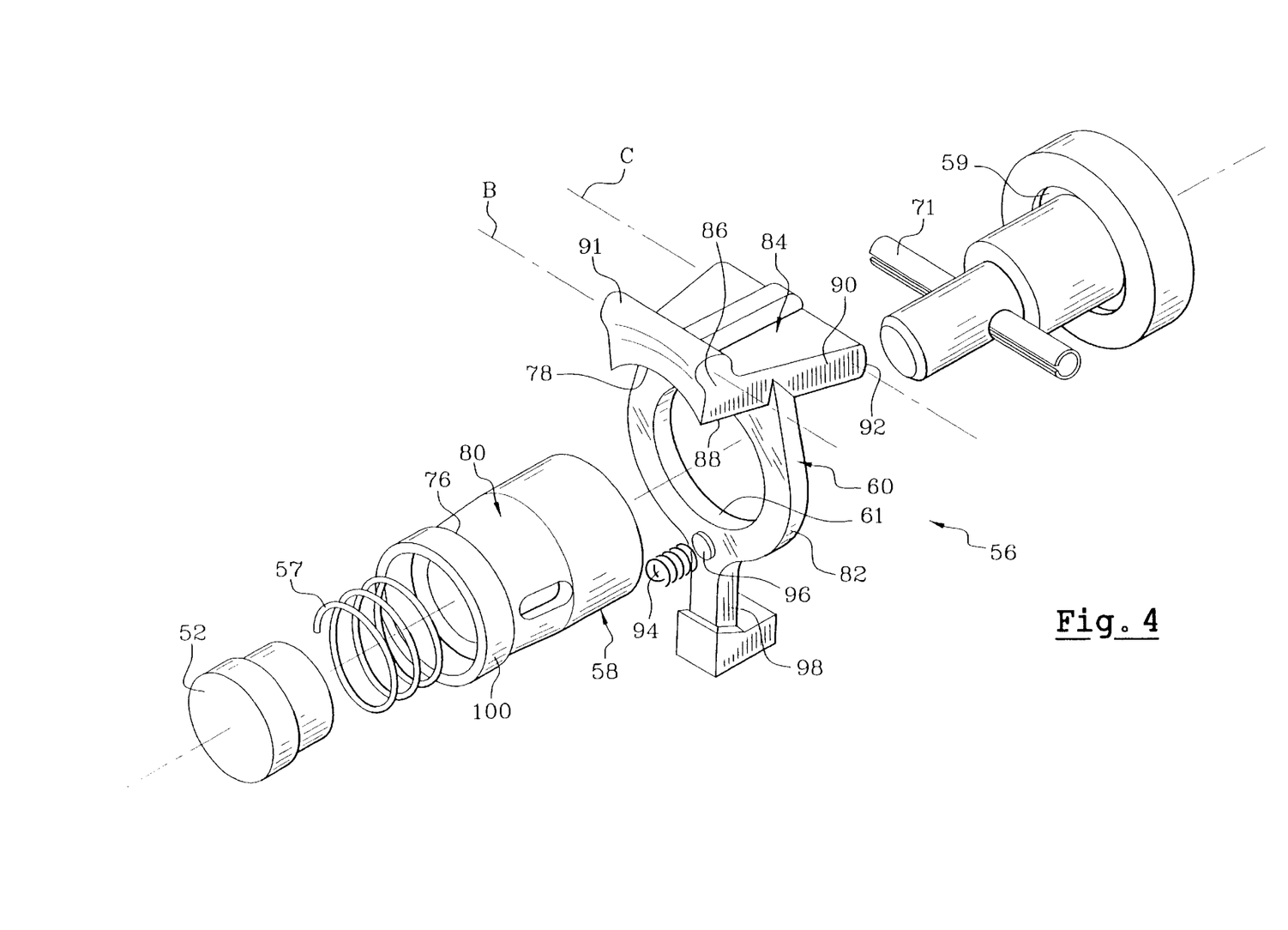
FIG. 4 is a detail three-quarter front perspective exploded view of the finger, the sleeve, the key and the plunger of the servomotor shown in FIG. 3.

To this end, according to the present invention and as illustrated in FIG. 4 et seq., the unidirectional clutch device 56 comprises at least one transverse face 76 for the locking of the sleeve 58, facing axially rearwards so as to form a stop for a peg 78, provided on the key 60 and extending radially towards the sleeve 58, for an axial indexing of the end locking position of the sleeve 58.

With this object in view, the sleeve 58 exhibits a cylindrical periphery with a substantially constant diameter, and it comprises a radial groove 80, a shoulder-forming transverse face, of which, arranged at the front part of the sleeve 58 and facing rearwards, constitutes the locking transverse face 76.

Such arrangement is by no means restrictive. As a matter of fact, in the preferred embodiment of this invention, the locking transverse face 76 is annular, but it could just as well consist of an angular portion or sector of a ring-shaped element, or of a collar protruding from a cylindrical body of the sleeve 58, without altering the features and advantages provided by the invention.

Figure 6:
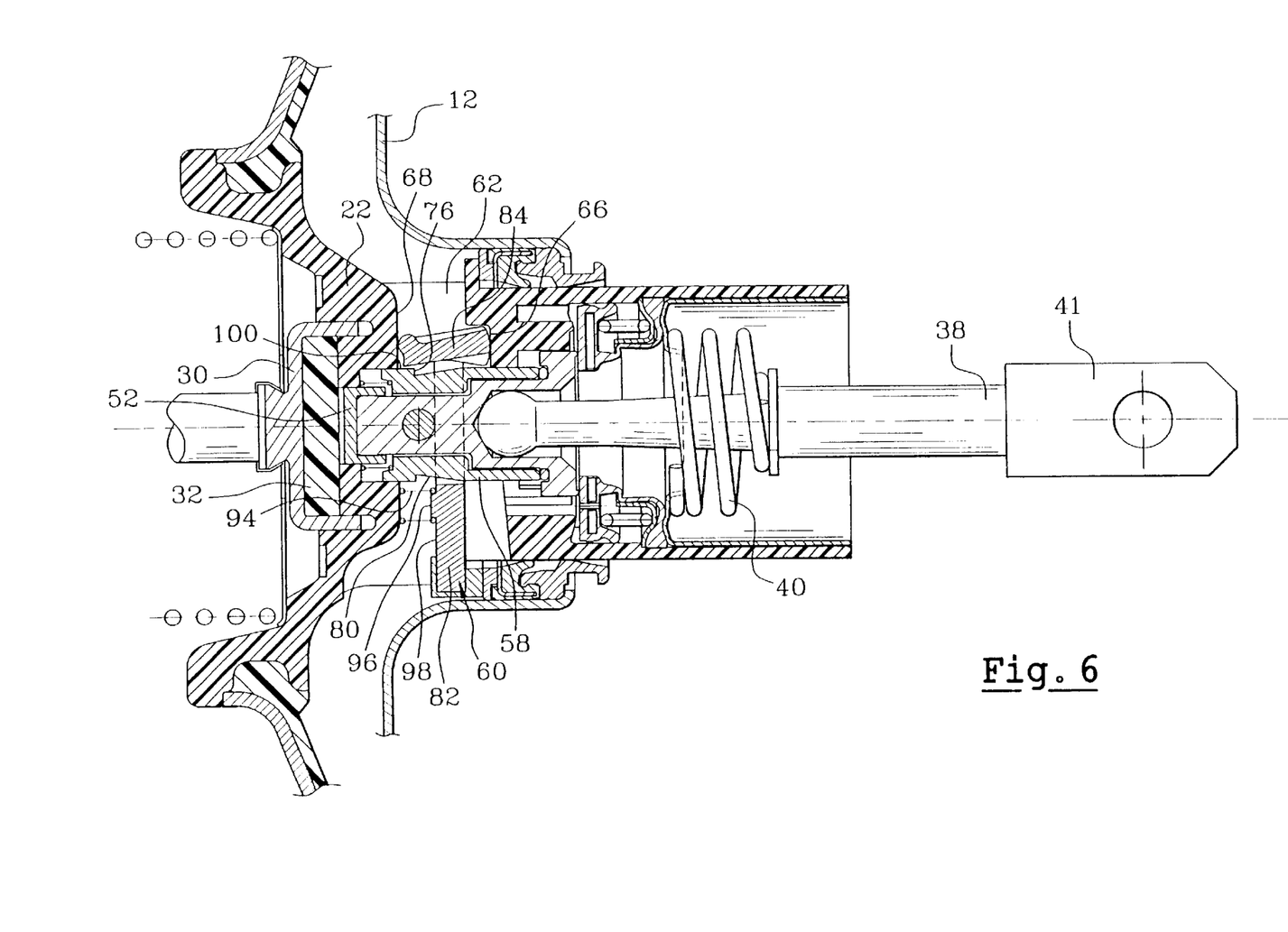
FIG. 6 is a detail axial sectional view of the servomotor of FIG. 4, the key and the sleeve being shown in the rest position.
Figure 7:
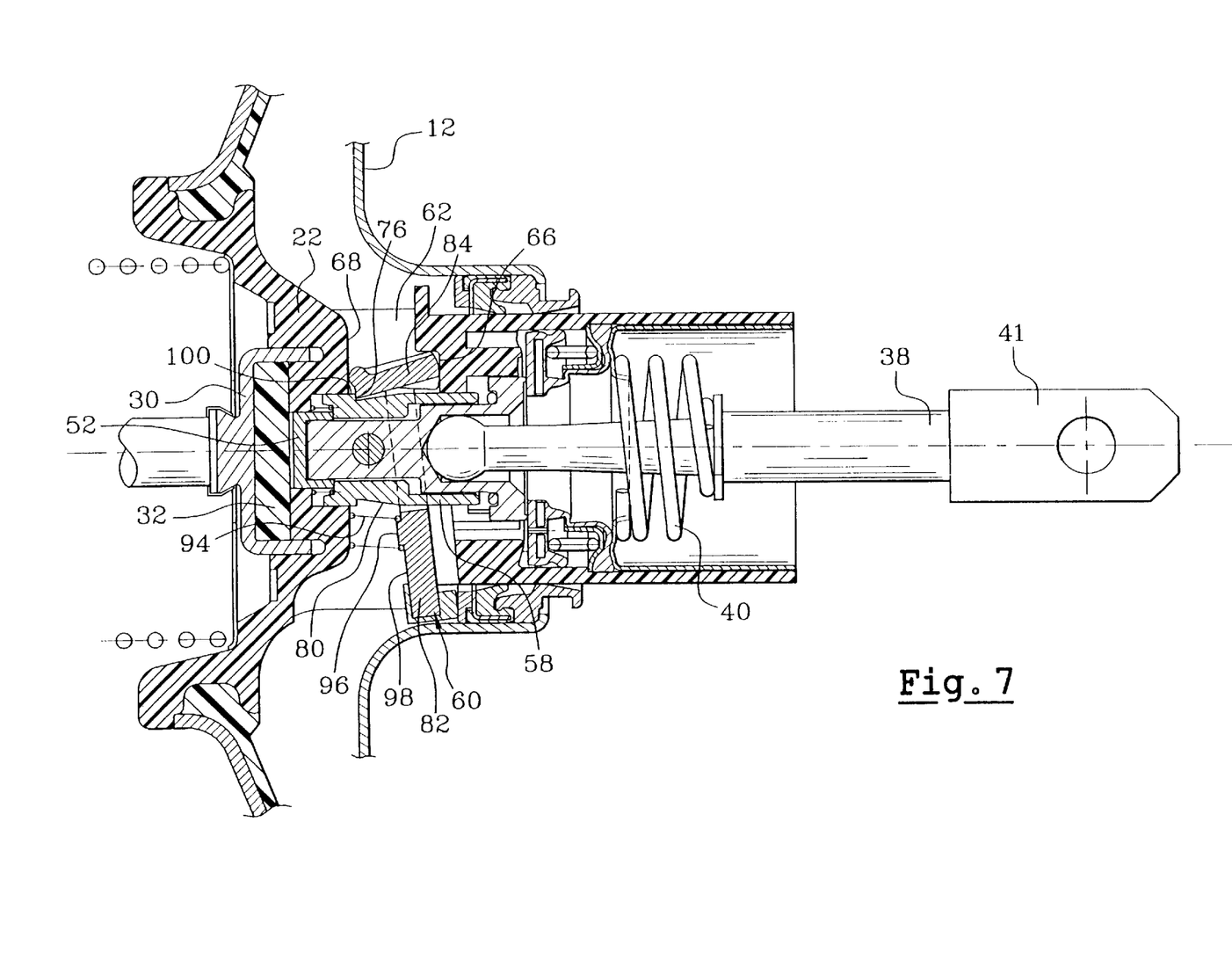
FIG. 7 is a detail axial sectional view of the servomotor of FIG. 4, the key being shown in the sleeve-locking position.

In an advantageous way, as shown in FIGS. 4, 6 and 7, the groove 80 has a substantially truncated-cone-shaped profile rearwardly of the shoulder-forming front transverse face 76. It results in that the end of the groove 80, opposite the shoulder-forming front transverse face 76, gradually merges into the cylindrical periphery of the rear part of the sleeve 58.

The truncated-cone shape of the groove 80 made in the sleeve 58 is particularly advantageous in that, on the rocking of the key 60, its peg 78 can be guided, said peg having the shape of a concave truncated-cone-shaped angular sector, complementary to the truncated-cone-shaped profile of the groove 80, up to its resting position against the shoulder-forming front transverse face 76 of the sleeve 58. The sleeve 58 comprises a cylindrical bearing surface 100, forwardly of the groove 80 and the function of which will be explained below.

Similarly to the key, which has been previously described with reference to FIG. 1, the key 60 includes a circular opening 61 surrounding the sleeve 58. But, as opposed to the above-described key 60 with reference to FIG. 1, the edge of said opening 61 does not take part in the locking of the sleeve 58.

As a matter of fact, as shown more especially in FIGS. 6 and 7, the key 60 has, in an axial sectional view, the general shape of a tee, the vertical branch 82 of which is substantially radially directed and includes the opening 61, which is traversed by the sleeve 58. The tee key 60 comprises a horizontal branch 84, which is substantially axially directed, perpendicularly to the main branch 82 and which is received, without any axial clearance, between the front wall 68 and the rear wall 66 of the cavity 62 traversing the piston 22, perpendicularly to the axis A of the latter.

Such configuration offers the advantage of allowing only a rocking motion of the key 60 within the cavity 62. As a matter of fact, the key 60 cannot move axially in relation to the cavity 62, but yet its branch 84 can rock into the cavity 62, as shown in FIG. 7.

The horizontal branch 84 of the tee key 60 carries the peg 78. More particularly, the front horizontal half-branch 86 of the tee key has a face 88 which radially faces the sleeve and from which the peg protrudes.

Moreover, the front end of the front half-branch 86 of the tee key 60 is shaped into a convex arc 91 of a cylinder in the direction of an axis B, orthogonal to the axis A of the piston 22, so as to bear against the front transverse wall 68 of the cavity. This arc 91 of a cylinder makes it possible, in particular, for the half-branch 86 to slide easily along the front transverse wall 68 of the cavity 62.

Figure 5:
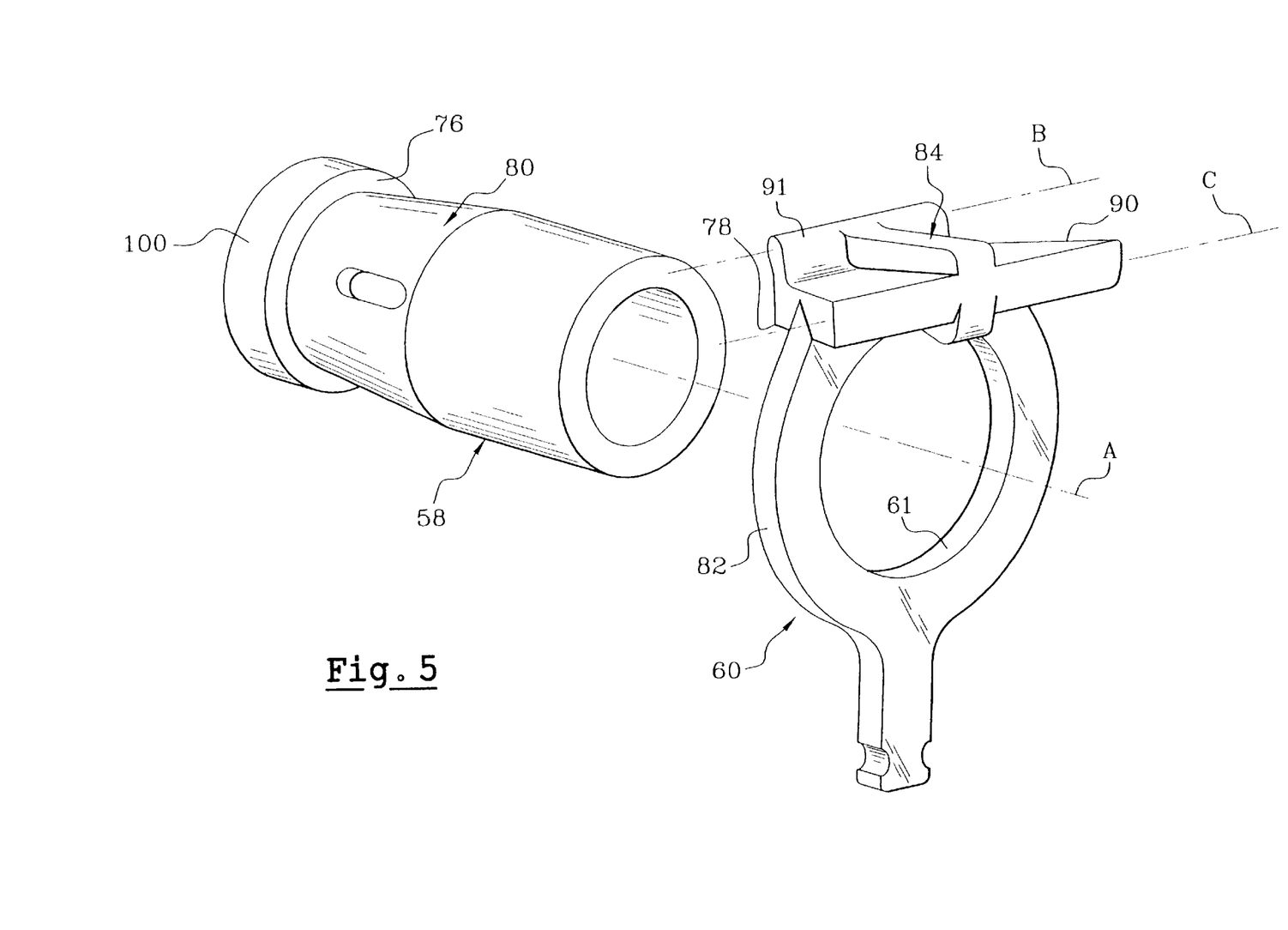
FIG. 5 is a detail three-quarter rear perspective exploded view of the key and the sleeve shown in FIG. 4.

In a similar way, the rear end of the rear half-branch 90 of the tee key is shaped into a convex arc 92 of a cylinder in the direction of an axis C, orthogonal to the axis A of the piston 22, so as to slide along the rear transverse wall 66 of the cavity 62. This arc 92 of a cylinder makes it possible, in particular, for the half-branch 90 to slide easily along the rear transverse wall 66 of the cavity 62, on the rocking of the key 60. Such configuration is illustrated in FIG. 5.

As shown in FIGS. 6 and 7, the key 60 is mounted in the cavity 62 substantially similarly to the above-described key 60, with this difference that the tee key 60 according to this invention is resiliently biased against the transverse wall 66 of the cavity by a compression spring 94, arranged between the front transverse wall 68 of the cavity 62 and a centering spigot 96, provided on the tee key 60 and protruding from a lower part 98 of the vertical branch 82 of the tee, on the opposite side relatively to the peg 78.

It results in that, when no force is exerted on the control rod 38, the key 60 is located as represented in FIG. 6, its horizontal branch 84 being substantially parallel to the axis A of the piston 22, whereas its vertical branch 82 is substantially perpendicular to said axis A.

When the driver actuates the control rod 38 at a comparatively low speed, which corresponds to a gradual braking operation, the moving piston 22 travels substantially at the same speed as the plunger 46, since the atmospheric pressure "$P_a$" becomes progressively established as the three-way valve 50 opens. In this configuration, owing to the fact that the horizontal branch 84 is retained between the front wall 68 and the rear wall 66 of the cavity without any possibility of an axial motion, the key 60 rocks as soon as the vertical branch 82 of the key separates from the support 72 integral with the casing 12. Then the peg 78 comes into contact with the sleeve 58, at the cylindrical bearing surface 100, arranged at the front part in relation to the groove 80, but it does not engage the truncated-cone-shaped groove 80.

Therefore, if the driver releases the braking force, the key 60 does not lock the sleeve 58 and it does not either oppose the front-to-rear travel of the moving piston 22.

On the other hand, if the driver pulls violently the control rod 38, which corresponds to an emergency braking situation, the plunger 46 moves forward faster than the moving piston 22 does, owing to the delay involved in the equalization of the pressure in the rear chamber 18. As a result, when the key 60 rocks, the peg 78 is received in the groove 80 and it slides in it till it abuts against the shoulder-forming face 76.

Then, if the driver releases somewhat the braking force, the key 60 locks the sleeve 58, the end annular bearing surface 74 of which locks the finger 52 and thus opposes the return travel of the moving piston 22, independently of the position of the plunger 46. Such position ensures the maintaining of a maximum braking force on the piston 22.

When the driver releases the braking force to a great extent, the return motion of the control rod 38 actuates the plunger 46, the pin 71 of which biases the vertical branch 82 of-the key 60 in the front-to-rear direction, which results in the unlocking of the key 60. Besides, the return of the plunger 46 causes the three-way valve 50 to open. The re-evacuation of the rear chamber 18 makes the piston 22 travel and therefore the key 60 is brought back to its rest position, since its horizontal branch 84 is guided between the front wall 68 and the rear wall 66 of the cavity 62.

Therefore, in an advantageous manner, the present invention gives the benefit of a maximum braking force in emergency braking situations, whatever the driver's behaviour may be following the jamming on of the brakes.

What is claimed is:

1. A pneumatic servomotor (10) for providing an assisted braking of a motor vehicle, said servomotor having a rigid casing (12) in which a transverse partition wall (14) is movable and defines in an airtight manner a front chamber (16) under a first engine negative pressure ($P_1$), and a rear chamber (18) under a second pressure ($P_2$), said second pressure varying between said first pressure and atmospheric pressure ($P_a$); said partition wall (14) including integral piston (22) with a control rod (38) that moves in a bore inside said piston (22), said control rod movement being selective as a function of an axial input force exerted in the forward direction against a return force applied to the rod (38) by a return spring (40); said axial input force biasing said control rod (38) towards either an intermediate actuation position or an end actuation position as a function of a rate of speed at which said input force is applied to said control rod; a plunger (46) located in said bore in said piston (22) and arranged at a front end of said control rod (38) inside the piston (22), and a three-way valve (50), including at least an annular seat (48) borne by a rear section of the plunger (46), and capable of varying a second pressure ($P_2$) prevailing within the rear chamber (18) by connecting said front chamber (16) with said rear chamber (18) when said control rod (38) is in a rest position and by gradually connecting said rear chamber (18) with said atmospheric pressure ($P_a$) when the control rod (38) is actuated by an input force; a finger (52) that is slidingly fitted on a front end of said plunger (46) and biased by said plunger (46) into contact with a reaction disk (32) carried by said moving piston (22) to transmit a reaction force from the moving piston (22) to the plunger (46) and to the control rod (38); and a unidirectional clutch device (56) that includes a coaxial sleeve (58) that slides on said plunger (46), and a substantially ring-shaped key (60), arranged with a given clearance around the sleeve (58) and being driven by the moving piston (22) when the input force is applied at a predetermined rate of speed, said predetermined rate of speed causing said key (60) to rotate on a generally transverse axis and co-operate with a periphery surface of said sleeve (58) to lock said sleeve in a end front axial position wherein a front end annular bearing surface (74) of said sleeve locks said finger (52), independently of the plunger (46) and of the control rod (38), said unidirectional clutch device (56) having at least one locking transverse face (76) for engagement by said sleeve, said face being axially directed rearwards to form a stop for a peg (78) located on said key (60) and extending radially towards said sleeve (58) for an axial indexing of said end locking position of the sleeve (58).

2. The pneumatic servomotor (10) according to claim 1, characterised in that said sleeve (58) has a cylindrical periphery with a substantially constant diameter, said cylindrical periphery having a radial groove (80) and a shoulder-forming front transverse face of that constitutes said locking transverse face (76).

3. The pneumatic servomotor (10) according to claim 2 characterised in that said groove (80) has a substantially truncated-cone-shaped profile, rearwardly of said shoulder-forming front transverse face (76).

4. The pneumatic servomotor (10) according to claim 3, characterised in that said peg (78) has the shape of a concave truncated-cone-shaped angular sector that is complementary to said truncated-cone-shaped profile of said groove (80) in said sleeve (58).

5. The pneumatic servomotor (10) according to claim 1, characterised in that said key (60) has, in an axial sectional view, a shape of a tee, with a vertical branch (82) that is substantially radially directed and traversed by said sleeve (58) and horizontal branch (84) that is substantially axially directed and received without any axial clearance between first and second opposite walls (66, 68) of a cavity (62) that perpendicularly traverses axis (A) of said piston (22) to allow rocking motion of said key (60) inside of said cavity (62).

6. The pneumatic servomotor (10) according to claim 5, characterised in that a front half-branch (86) of said horizontal branch (84) of said tee key (60) has a face (88) that radially faces the sleeve (58) and from which said peg (78) protrudes.

7. The pneumatic servomotor (10) according to claim 6, characterised in that said front half-branch (86) of said tee key (60) is shaped into a convex arc (91) of a cylinder in the direction of an axis (B) that is orthogonal to said axis (A) of said piston (22), said front half-branch (86) bearing against a front transverse wall (68) of said cavity (62).

8. The pneumatic servomotor (10) according to claim 7, characterised in that a rear half-branch (90) of said horizontal branch (84) of said tee key (60) is shaped into a convex arc (92) of a cylinder in the direction of an axis (C) that is orthogonal to said axis (A) of said piston (22), rear half-branch (90) co-operating with a rear transverse wall (66) of said cavity (62).

9. The pneumatic servomotor (10) according to claim 8, characterised in that said tee key (60) is resiliently biased against said rear transverse wall (66) of said cavity (62) by a compression spring (94), arranged between said front transverse wall (68) of said cavity (62) and a centring spigot (96) located on and protruding from a part (98) of said vertical branch (82) radially opposite said peg (78).

* * * * *